United States Patent
Wozniak et al.

(10) Patent No.: US 10,530,861 B2
(45) Date of Patent: Jan. 7, 2020

(54) UTILIZING MULTIPLE STORAGE POOLS IN A DISPERSED STORAGE NETWORK

(71) Applicant: International Business Machines Corporation, Armonk, NY (US)

(72) Inventors: Ethan S. Wozniak, Park Ridge, IL (US); Andrew D. Baptist, Mt. Pleasant, WI (US); Greg R. Dhuse, Chicago, IL (US); Ilya Volvovski, Chicago, IL (US); Jason K. Resch, Chicago, IL (US); Thomas D. Cocagne, Elk Grove Village, IL (US)

(73) Assignee: PURE STORAGE, INC., Mountain View, CA (US)

( * ) Notice: Subject to any disclaimer, the term of this patent is extended or adjusted under 35 U.S.C. 154(b) by 204 days.

(21) Appl. No.: 15/818,633

(22) Filed: Nov. 20, 2017

(65) Prior Publication Data
US 2018/0077240 A1    Mar. 15, 2018

Related U.S. Application Data

(63) Continuation-in-part of application No. 14/984,024, filed on Dec. 30, 2015, now Pat. No. 10,078,472.

(60) Provisional application No. 62/121,736, filed on Feb. 27, 2015.

(51) Int. Cl.
*H04L 29/08* (2006.01)
*G06F 11/10* (2006.01)
*G06F 3/06* (2006.01)

(52) U.S. Cl.
CPC ........ *H04L 67/1097* (2013.01); *G06F 3/0604* (2013.01); *G06F 3/0689* (2013.01); *G06F 11/1092* (2013.01); *G06F 3/064* (2013.01); *G06F 3/067* (2013.01); *G06F 3/0619* (2013.01)

(58) Field of Classification Search
CPC . H04L 67/1097; G06F 3/0604; G06F 3/0689; G06F 3/0619; G06F 3/064; G06F 3/067; G06F 2211/1028
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Phung M Chung
(74) *Attorney, Agent, or Firm* — Garlick & Markison; Timothy W. Markison; Bruce E. Stuckman

(57) ABSTRACT

A method for execution by a dispersed storage and task (DST) processing unit includes receiving data for storage. A storage approach for the data is determined based on the data. Storage of the data in a plurality of sets of storage units is facilitated in accordance with the storage approach. A determination is made to recover the data from storage, and a set of storage units is selected from the plurality of sets of storage units for recovery of the data. Recovery of the data from the selected set of storage units is facilitated.

20 Claims, 6 Drawing Sheets

(56) References Cited

U.S. PATENT DOCUMENTS

| | | |
|---|---|---|
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 9,110,833 B2 | 8/2015 | Gladwin et al. |
| 9,727,275 B2 | 8/2017 | Kazi |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2014/0331086 A1 | 11/2014 | Resch |
| 2017/0147428 A1 | 5/2017 | Volvovski et al. |
| 2017/0300374 A1 | 10/2017 | Gladwin et al. |
| 2018/0074890 A1* | 3/2018 | Alnafoosi ........... G06F 11/1076 |
| 2018/0107421 A1* | 4/2018 | Kazi ..................... G06F 3/0608 |
| 2019/0050280 A1* | 2/2019 | Khadiwala ......... H04L 67/1097 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 1511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

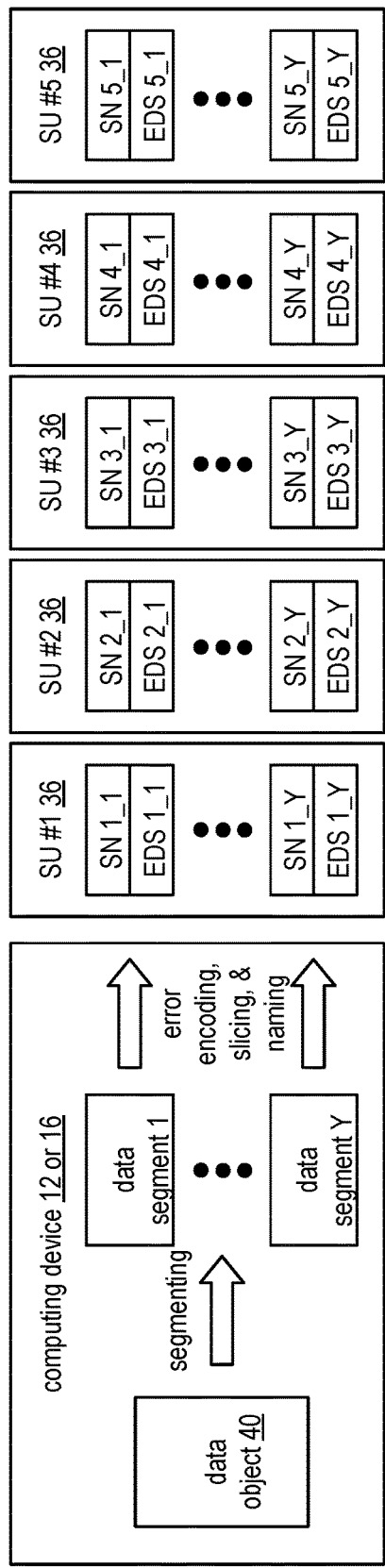
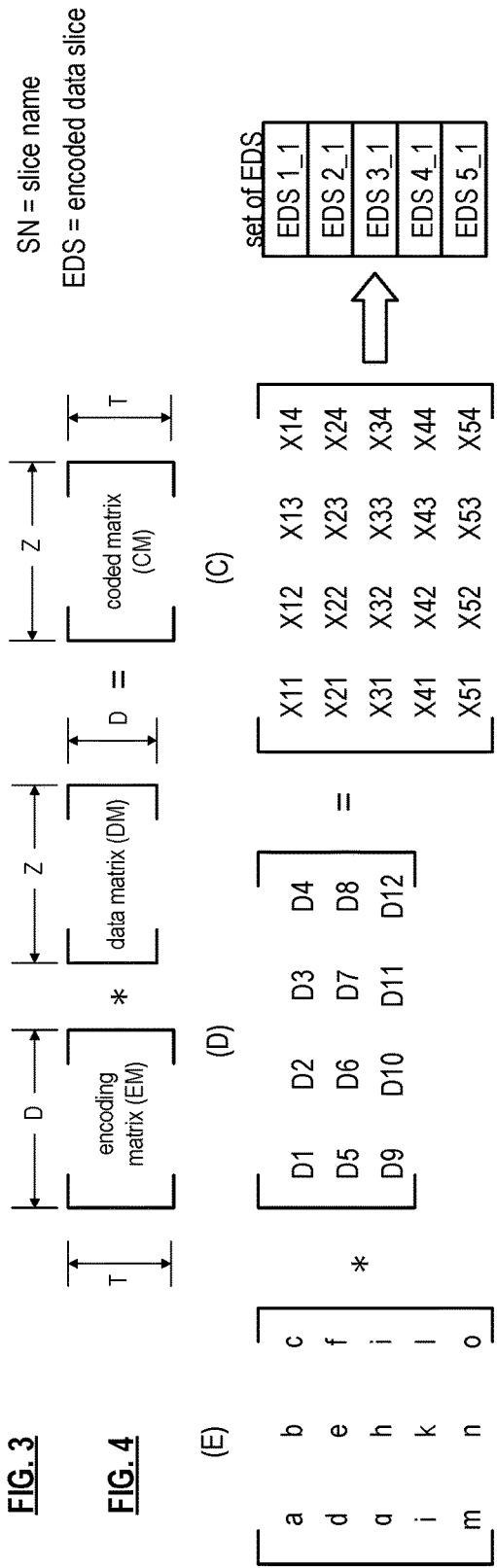

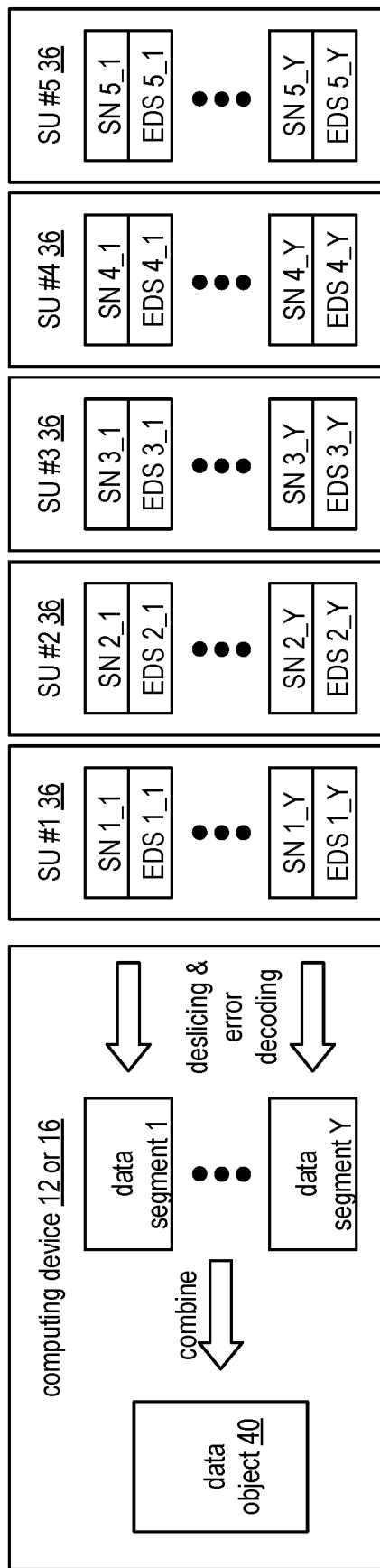

UTILIZING MULTIPLE STORAGE POOLS IN A DISPERSED STORAGE NETWORK

CROSS-REFERENCE TO RELATED APPLICATIONS

The present U.S. Utility Patent Application claims priority pursuant to 35 U.S.C. § 120 as a continuation-in-part of U.S. Utility application Ser. No. 14/984,024, entitled "REBUILDING ENCODED DATA SLICES IN A DISPERSED STORAGE NETWORK", filed Dec. 30, 2015, which claims priority pursuant to 35 U.S.C. § 119(e) to U.S. Provisional Application No. 62/121,736, entitled "TRANSITIONING A STATE OF A DISPERSED STORAGE NETWORK", filed Feb. 27, 2015, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 7 is a schematic block diagram of an example of dispersed storage error decoding of data in accordance with the present invention;

FIG. 8 is a schematic block diagram of a generic example of an error decoding function in accordance with the present invention;

DETAILED DESCRIPTION OF THE INVENTION

Figure 1:
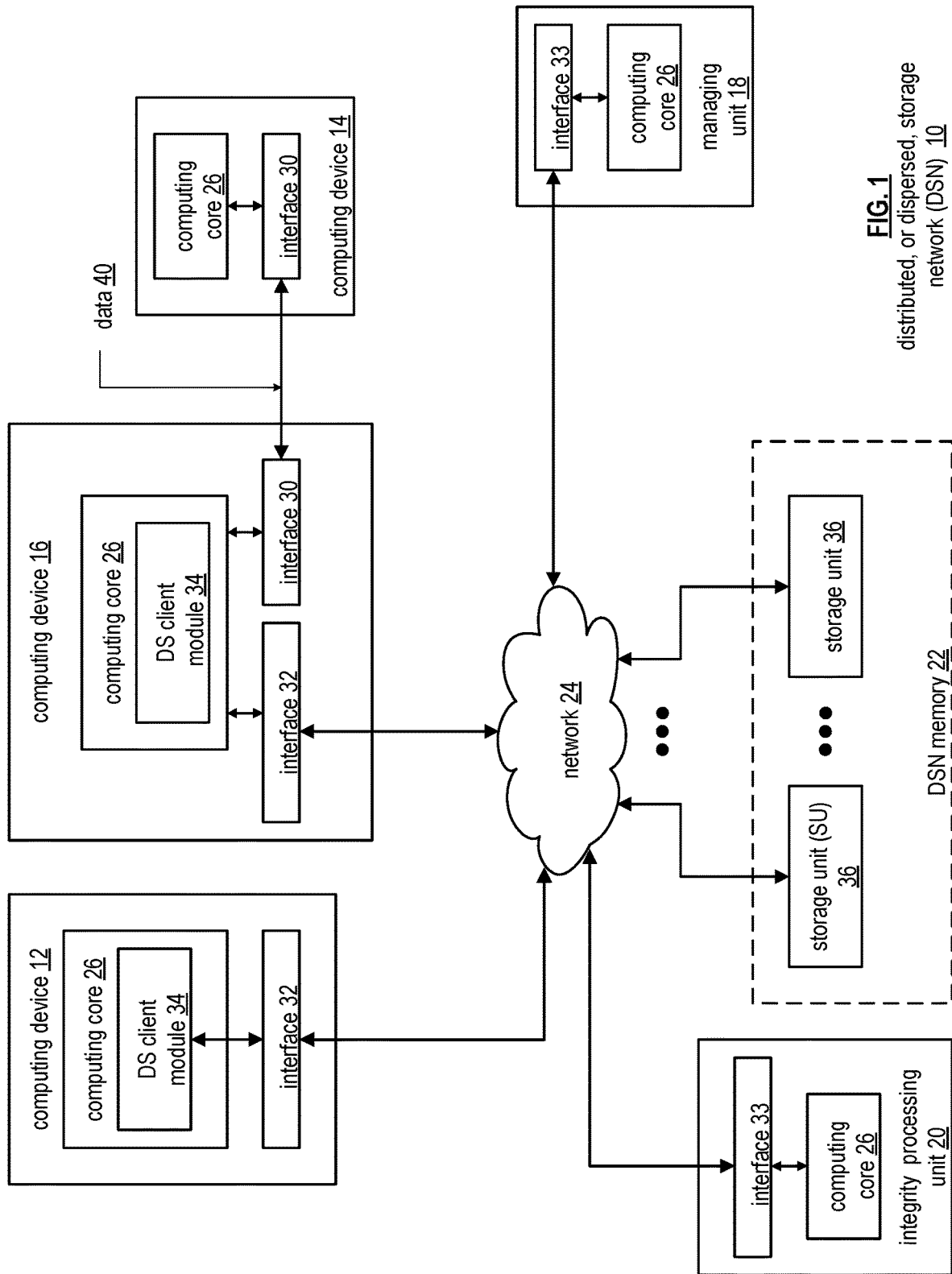
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
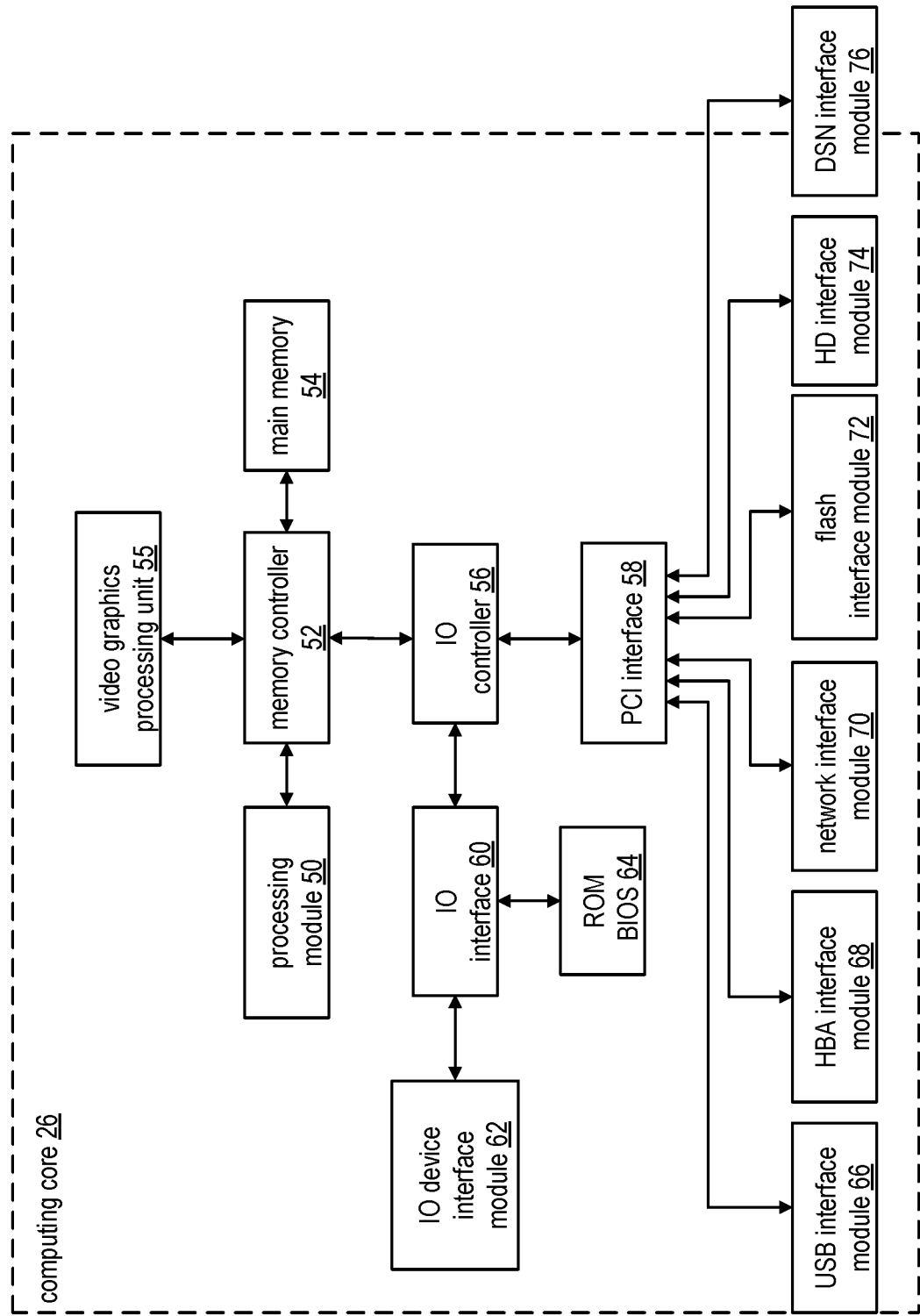
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
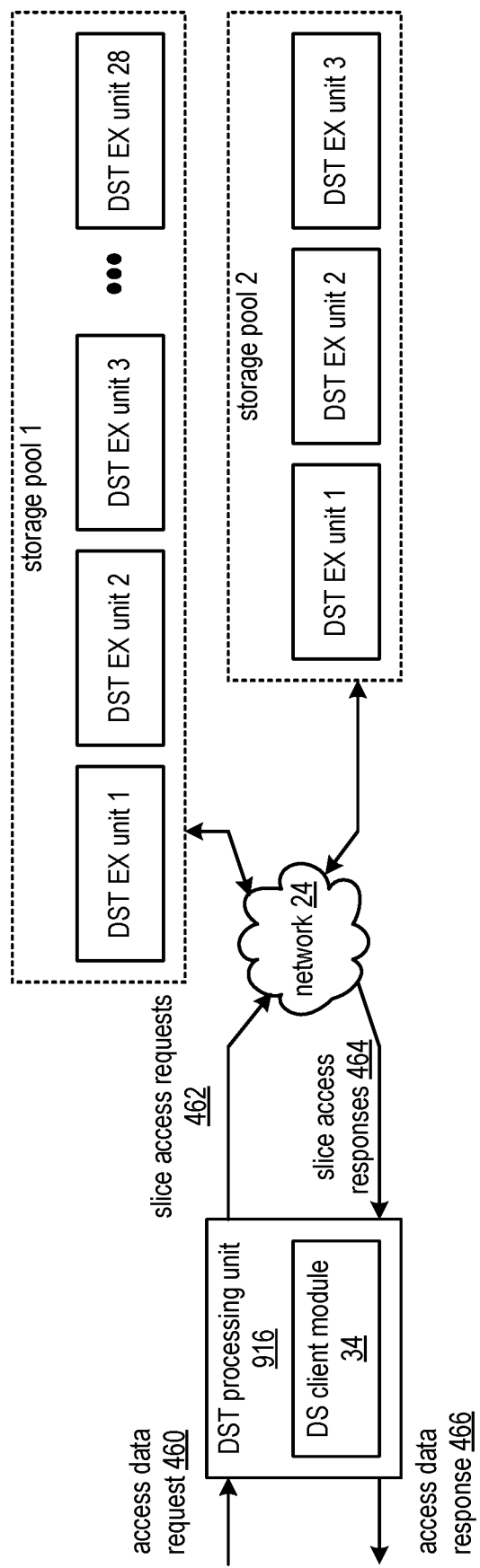
FIG. 9 is a schematic block diagram of an embodiment of a dispersed or distributed storage network (DSN) in accordance with the present invention.

FIG. 9 is a schematic block diagram of an embodiment of a dispersed storage network (DSN) that includes a distributed storage and task (DST) processing unit 916, the network 24 of FIG. 1, and a plurality of storage pools 1-2. The DST processing unit 916 can be implemented by utilizing computing device 12 or 16 of FIG. 1 and/or another device communicating with network 24. The DST processing unit can include the DS client module 34 of FIG. 1 or otherwise can include one or more processors and memory. Each storage pool can include a set of distributed storage and task (DST) execution units. Each DST execution unit may be implemented utilizing the DST execution unit 36 of FIG. 1, operable to store dispersed error encoded data and/or to execute, in a distributed manner, one or more tasks on data. As used herein, a plurality of sets of storage units can correspond to a plurality of storage pools. A number of DST execution units of a set of DST execution units are in accordance with a storage approach, and the DSN functions to access data (e.g., store the data, retrieve the data, delete the data) utilizing the plurality of storage pools in accordance with a storage approach.

The storage approach includes utilizing one or more sets of dispersal parameters of one or more dispersed storage error coding functions such that associated access results can be obtained. Such results can include a data retrieval reliability centric focus and a speed of access centric focus. For example, the storage pool 1 is associated with the data retrieval reliability centric focus when associated dispersal parameters includes an information dispersal algorithm (IDA) pillar width of 28 and a decode threshold level of 20. As another example, the storage pool 2 is associated with the speed of access centric focus when associated dispersal parameters includes an IDA pillar width of 3 and a decode threshold level of 2. As used herein, an IDA configuration described as "X-of-Y" indicates an IDA configuration with a decode threshold level and/or write threshold of X and a pillar width of Y. In this example, storage pool 1 is in accordance with an IDA configuration of 20-of-28, and storage pool 2 is in accordance with an IDA configuration of 2-of-3.

Different dispersal configurations come with different caveats. Reliable and storage efficient dispersal configuration typically require storage approaches with high values, or "wide" values, for IDA width. However, wide IDA configurations (e.g. 10-of-15, 20-of-28) can lead to significant cost in terms of I/O Operations (e.g. disk seeks), which can impose a bottleneck for some workloads which are I/O Operations Per Second (IOPS) constrained. Meanwhile, storage approaches with IDA configurations that include smaller IDA widths, or "narrow" configurations, can be unreliable, inefficient, or both (e.g. 1-of-1, 1-of-3, 2-of-3). As used herein, a first IDA configuration is "wider" than a second IDA configuration when the first IDA configuration has higher IDA parameters than the second IDA configuration.

Utilizing a storage approach that involves storing data under multiple dispersal configurations can overcome these constraints and institute a DSN memory that has high reliability together with high performance. For any given data, such as a data object or other source to be stored, the data can be processed by utilizing both a wide IDA configuration and a narrow IDA configuration, by performing an dispersed error encoding algorithm on the data under each configuration. Both sets of slices outputted by applying both IDA configurations can each be stored in the DSN in different sets of storage units. The slices may be named similarly, or can be named in a derivative fashion such that a deterministic process can take the names of slices produced by the wide IDA and get the slice names for the narrow IDA and vice versa. This enables a DST processing unit, DS client module, or other processing system in the DSN, to determine which retrieval method to employ upon an access request: to access the slices from the wide IDA (wide slices) or the slices from the narrow IDA (narrow slices).

This determination by a processing system of a DST processing unit, DS client module, or other processing system of the DSN can include, for example, determining that either the wide or narrow slices can be retrieved in response to determining that the object is large and IOPS are not a concern. As another example, in response to determining that the most up-to-date and "canonical" version of the source is needed (e.g. when performing an update/overwrite) a processing system can determine to retrieve the wide slices. As another example, in response to determining that performance is critical and IOPS are to be maximized, a processing system can determine to retrieve the narrow slices. As another example, in response to determining that consistency is required or when sufficient time has passed without checking the version of the wide slices, a processing system can determine to retrieve the wide slices. As another example, in response to determining that data has been lost for either of the two versions, the processing system can determine to restore the source from the extant alternate version of slices, for example, by rebuilding the narrow slices by utilizing the wide slices.

In various embodiments, the total overhead of such a system using two IDA configurations will always be greater than 2, and will be exactly equal to $(W_w/T_w)+(W_d/T_n)$, where $W_w$ is the write threshold number of the wide IDA configuration, $T_w$ is the pillar width of the wide IDA configuration, $W_n$ is the write threshold number of the narrow IDA configuration, and $T_n$ is the pillar width of the narrow IDA configuration. Due to this decreased storage efficiency, a processing system of a DST processing unit can utilize another storage approach that utilizes only one IDA configuration on other data received for storage. For example, the DST processing unit can choose to only compute and store narrow slices when the source is sufficiently small. This can be determined to be an acceptable trade off because the IOPS can be the greatest concern for small objects (for example, since the seek takes a more substantial proportion of the time to read the slice when the object is small). Also, when the source is small, this excess storage overhead may be negligible.

When a DST processing unit stores slices for a source, it can determine if the size of the source is above or below some determined cut-off and/or otherwise compares favorably to a predetermined threshold when selecting which IDA configurations to utilize in the storage approach, and whether or not multiple IDA configuration should be utilized. For example, if the source size is smaller than that cut off, then only a set of narrow slices can be computed and stored, or an additional set of narrow slices can be computed and stored. This determination can also be based on an expected access frequency (for example, if the source is likely to be read many times over its life, or accessed more frequently the benefits of storing narrow slices increases), and can include comparing a determined expected access frequency to an access frequency threshold. Finally, the choice of the IDA parameters for the narrow slices can depend on the level of required security and reliability, and the determination can include comparing a source security requirement to a security threshold and/or comparing a source reliability requirement to a reliability threshold. If no security is required, then any 1-of-N configuration (e.g. a 1-of-1 or 1-of-3) can be used. However, if security (via secure slice methods) is required, then the threshold must be greater than 1 (e.g. a 2-of-2 or 2-of-3).

In an example operation of the accessing of the data, the DST client module 34 receives data for storage. The receiving can include at least one of receiving an access data request 460, where the access data request 460 includes a store data request. The store data request can include one or more of the data, a data identifier of the data, and a storage approach preference.

Having received the data for storage, the DST client module 34 can determine the storage approach (e.g., selecting a storage pool) for the data based on the data (e.g., and based on characteristics of the storage pools). The determining can include selecting one or both storage pools for storage of the data. The determining can include at least one of indicating to utilize storage pool 2 when a data size is less than a small data size maximum threshold level, indicating to utilize storage pool 1 when the data size is greater than a large data size minimum threshold level, selecting a storage pool based on a requested storage pool approach preference, indicating storage pool 1 when an expected frequency of data access is greater than an access threshold level, interpreting system registry information to determine a storage pool selection, utilizing a predetermination which may include storing the data in both storage pools substantially simultaneously, establishing updated dispersal parameters in accordance with updated system registry information, and/or determining the dispersal parameters based on the data (e.g., for a desired level of retrieval reliability versus access performance).

Having determined the storage approach for the data, the DST client module 34 can facilitate storage of the data in one or more of the storage pools in accordance with the storage approach. For example, the DST client module 34 dispersed storage error encodes the data utilizing dispersal parameters associated with the storage approach to produce a plurality of sets of encoded data slices and sends, via the network 24, slice access requests 462 that include the plurality of sets of encoded data slices to DST execution units of the selected plurality of storage pools for storage. As another example, the DST client module 34 dispersed storage error encodes the data utilizing dispersal parameters associated with the storage approach to produce a single set of encoded data slices and sends, via the network 24, slice access requests 462 that include the set of encoded data slices to DST execution units of a single selected storage pool for storage.

Having stored the data, the DST client module 34 can determine to recover the data from at least one of the storage pools. The determining can include at least one of receiving another access request that includes a read data request, detecting loss of the data from at least one of the storage pools, and/or interpreting a consistency check scheduled to facilitate updating consistency between the data stored on two or more of the storage pools.

Having determined to recover the data, the DST client module 34 can select a storage pool of the plurality of storage pools for recovery of the data. The selecting includes at least one of randomly selecting when the data is greater than a large data size threshold level and recovery performance within a timeframe is not required, selecting the first storage pool when a most up-to-date version is required, selecting the second storage pool when retrieval performance is to be maximized, selecting the first storage pool in a time frame since a last retrieval is greater than a retrieval time threshold level, and/or selecting another storage pool when data losses are detected from a storage pool. In various embodiments, multiple storage pools are selected for recovery of the data, for example, to facilitate updating consistency between the data stored on two or more of the storage pools.

Having selected the storage pool, the DST client module 34 facilitates recovery of the data from the selected storage pool. For example, the DST client module 34 issues, via the network 24, slice access requests 462 that includes read slice requests to the DST execution units of the selected storage pool, receives slice access responses 464 that includes read slice responses, and for each set of encoded data slices, dispersed storage error decodes a decode threshold number of received encoded data slices to reproduce the data, and issues an access data response 466 that includes the reproduced data.

In various embodiments, a processing system of a dispersed storage and task (DST) processing unit includes at least one processor and a memory that stores operational instructions, that when executed by the at least one processor cause the processing system to receive first data for storage. A first storage approach for the first data is determined based on the first data. Storage of the first data in a plurality of sets of storage units is facilitated in accordance with the first storage approach. A determination is made to recover the first data from storage. A set of storage units is selected from the plurality of sets of storage units for recovery of the first data. Recovery of the first data from the selected set of storage units is facilitated.

In various embodiments, determining the first storage approach includes determining a number of sets of storage units for storage, and wherein a number of the plurality of sets of storage units is in accordance with the determined number of sets. In various embodiments, second data is received for storage. A second storage approach is determined for the second data based on the second data. Determining the second storage approach includes determining to store the second data in exactly one set of storage units, and determining the second storage approach further includes selecting the one set of storage units. Storage of the second data in the one set of storage units is facilitated in accordance with the second storage approach.

In various embodiments, a first set of the plurality of sets of storage units is in accordance with a first information dispersal algorithm (IDA) configuration, a second set of the plurality of sets of storage units is in accordance with a second IDA configuration, the first IDA configuration is wider than the second IDA configuration, and the second set is selected for storage of the second data. In various embodiments, a first size of the first data is compared to a small size threshold and a second size of the second data is compared to the small size threshold. The number of the plurality of sets of storage units for storage of the first data is determined to be greater than one in response to determining that the first size of the first data compares unfavorably to the small size threshold. The second data is determined to be stored in the exactly one set of storage units in response to determining that the second size of the second data compares favorably to the small size threshold. In various embodiments, a first access frequency of the first data is compared to an access frequency threshold and a second access frequency of the second data is compared to the access frequency threshold. The number of the plurality of sets of storage units for storage of the first data is determined to be greater than one in response to determining that the first access frequency of the first data compares unfavorably to the access frequency threshold. The second data is determined to be stored in the exactly one set of storage units in response to determining that the second access frequency of the second data compares favorably to the access frequency threshold.

In various embodiments, determining the first storage approach includes selecting a plurality of information dispersal algorithm (IDA) configurations. The plurality of sets of storage units are selected based on determining each of the plurality of sets of storage units are in accordance with a corresponding one of the plurality of IDA configurations. The plurality of IDA configurations includes a first IDA configuration and a second IDA configuration, where the first IDA configuration is wider than the second IDA configuration. A first set of the plurality of sets of storage units is in accordance with the first IDA configuration, and a second set of the plurality of sets of storage units is in accordance with the second IDA configuration. In various embodiments, one of a high retrieval reliability approach and a low retrieval reliability approach is selected in response to determining to recover the first data. The first set is selected for recovery of the first data when the high retrieval reliability approach is selected. The second set is selected for recovery of the first data when the low retrieval reliability approach is selected. In various embodiments, the high retrieval reliability approach is selected in response to determining a size of the first data is larger than a large data size threshold level. In various embodiments, the high retrieval reliability approach is selected in response to determining that a time frame since a last retrieval is greater than a retrieval time frame threshold level. In various embodiments, the low retrieval reliability approach is selected in response to determining to maximize I/O operations per second.

Figure 10:
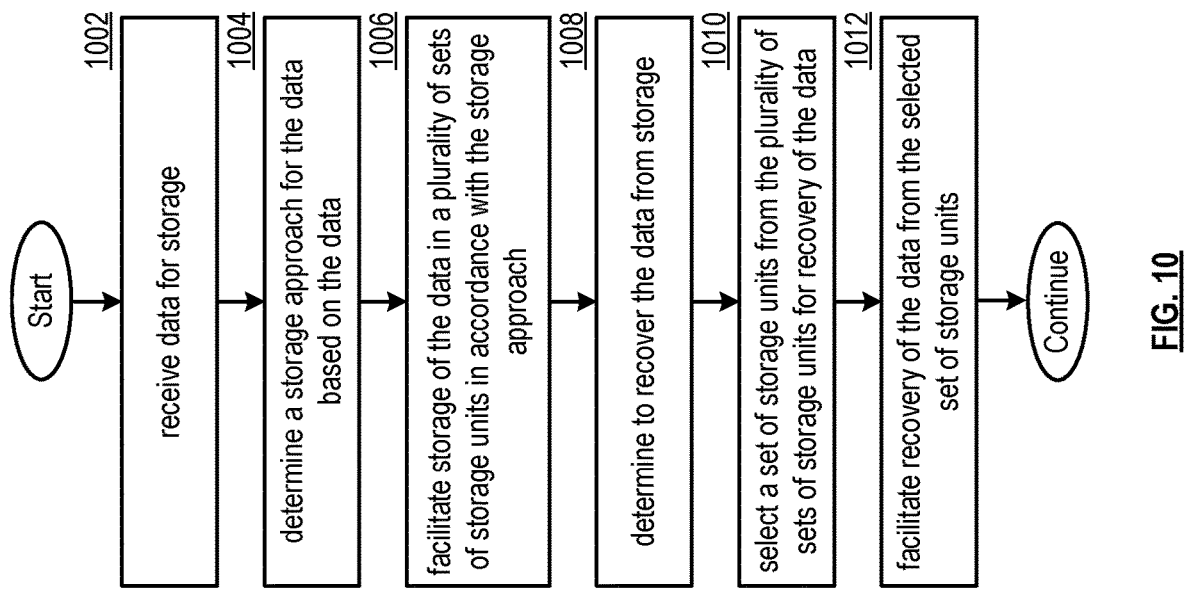
FIG. 10 is a logic diagram of an example of a method of utilizing multiple storage pools in accordance with the present invention.

FIG. 10 is a flowchart illustrating an example of accessing data by utilizing a plurality of storage pools. In particular, a method is presented for use in association with one or more functions and features described in conjunction with FIGS. 1-9, for execution by a dispersed storage and task (DST) processing unit that includes a processor or via another processing system of a dispersed storage network that includes at least one processor and memory that stores instruction that configure the processor or processors to perform the steps described below.

The method includes step 1002 where a processing system (e.g., of a distributed storage and task (DST) processing unit or DST client module) receives data for storage. The receiving can include includes receiving one or more of the data, a data identifier, a data size indicator, and a storage approach preference. The method continues at step 1004 where the processing system determines a storage approach for the data based on the data. The determining includes basing the determination on one or more of a predetermination, system registry information, the storage approach preference, and/or a request (e.g., use a set of storage units and associated dispersal parameters associated with high-performance when the data is smaller than a small size threshold, use another set of storage units and dispersal parameters when high retrieval reliability is required).

The method continues at step 1006 where the processing system facilitates storage of the data in a plurality of sets of storage units in accordance with the storage approach. For example, the processing system performs at least one dispersed error encoding algorithm to encode the data. The processing system can perform multiple dispersed error encoding algorithm on the data by utilizing multiple associated dispersal parameters, based on the storage approach, to produce a plurality of sets of encoded data slices. The processing system can send the plurality of sets of encoded data slices to a corresponding plurality of sets of storage units affiliated with the storage approach. In some embodiments, the storage approach includes storing the data in a single set of storage units, for example, when the storage approach includes utilizing a single IDA configuration to produce a single set of encoded data slices by performing a single dispersed error encoding algorithm on the data.

The method continues at step 1008 where the processing system determines to recover the data from storage. The determining includes at least one of receiving a data access request, detecting loss of data, and determining to facilitate a consistency check function. The method continues at step 1010 where the processing system selects a set of storage units from the plurality of sets of storage units for recovery of the data. For example, the processing system selects a set of storage units associated with high retrieval reliability when a most recent revision is required, the data size is larger than a large data size threshold level, and/or when a time frame since a last retrieval is greater than a retrieval time frame threshold level. As another example, the processing system selects a set of storage units associated with high-performance when high-performance is required and a DSN system activity level indicator indicates that a high level of system activity exists.

The method continues at step 1012 where the processing system facilitates recovery of the data from the selected set of storage units. For example, the processing system issues read slice requests to the selected set of storage units, receives read slice responses, and for each set of encoded data slices, dispersed storage error decodes a decode threshold number of received encoded data slices to reproduce a data segment of the data.

In various embodiments, a non-transitory computer readable storage medium includes at least one memory section that stores operational instructions that, when executed by a processing system of a dispersed storage network (DSN) that includes a processor and a memory, causes the processing system to receive data for storage. A storage approach for the data is determined based on the data. Storage of the data in a plurality of sets of storage units is facilitated in accordance with the storage approach. A determination is made to recover the data from storage, and a set of storage units is selected from the plurality of sets of storage units for recovery of the data. Recovery of the data from the selected set of storage units is facilitated.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a storage processing unit that includes a processor, the method comprises:
   receiving first data for storage;
   determining a first storage approach for the first data based on the first data, wherein determining the first storage approach includes determining a number of sets of storage units for storage of the first data;
   facilitating storage of the first data in a plurality of sets of storage units in accordance with the first storage approach, the plurality of sets of storage units corresponding to the number of sets of storage units;
   determining to recover the first data from storage based on at least one of: receiving an access request that includes a read data request or detecting loss of the first data from at least one set of storage units of the plurality of sets of storage units;
   selecting a selected set of storage units from the plurality of sets of storage units for recovery of the first data in accordance with one of: a high retrieval reliability approach or a low retrieval reliability approach; and
   facilitating recovery of the first data from the selected set of storage units.

2. The method of claim 1, and wherein a number of the plurality of sets of storage units is in accordance with the determined number of sets.

3. The method of claim 2, further comprising:
   receiving second data for storage;
   determining a second storage approach for the second data based on the second data, wherein determining the second storage approach includes determining to store the second data in exactly one set of storage units, and wherein determining the second storage approach further includes selecting the one set of storage units; and
   facilitating storage of the second data in the one set of storage units in accordance with the second storage approach.

4. The method of claim 3, wherein a first set of the plurality of sets of storage units is in accordance with a first information dispersal algorithm (IDA) configuration, wherein a second set of the plurality of sets of storage units is in accordance with a second IDA configuration, wherein the first IDA configuration is wider than the second IDA configuration, and wherein the second set is selected for storage of the second data.

5. The method of claim 4, further comprising:
   comparing a first size of the first data to a small size threshold and comparing a second size of the second data to the small size threshold;
   wherein the number of the plurality of sets of storage units for storage of the first data is determined to be greater than one in response to determining that the first size of the first data compares unfavorably to the small size threshold; and
   wherein the second data is determined to be stored in the exactly one set of storage units in response to determining that the second size of the second data compares favorably to the small size threshold.

6. The method of claim 4, further comprising:
   comparing a first access frequency of the first data to an access frequency threshold and comparing a second access frequency of the second data to the access frequency threshold;
   wherein the number of the plurality of sets of storage units for storage of the first data is determined to be greater than one in response to determining that the first access frequency of the first data compares unfavorably to the access frequency threshold; and
   wherein the second data is determined to be stored in the exactly one set of storage units in response to determining that the second access frequency of the second data compares favorably to the access frequency threshold.

7. The method of claim 1, wherein determining the first storage approach includes selecting a plurality of information dispersal algorithm (IDA) configurations, further comprising:
   selecting the plurality of sets of storage units based on determining each of the plurality of sets of storage units are in accordance with a corresponding one of the plurality of IDA configurations.

8. The method of claim 7, wherein the plurality of IDA configurations includes a first IDA configuration and a second IDA configuration, wherein the first IDA configuration is wider than the second IDA configuration, wherein a first set of the plurality of sets of storage units is in accordance with the first IDA configuration, and wherein a second set of the plurality of sets of storage units is in accordance with the second IDA configuration.

9. The method of claim 8, further comprising:
   selecting from one of: the high retrieval reliability approach and the low retrieval reliability approach in response to determining to recover the first data;
   wherein the first set is selected for recovery of the first data when the high retrieval reliability approach is selected; and
   wherein the second set is selected for recovery of the first data when the low retrieval reliability approach is selected.

10. The method of claim 9, wherein the high retrieval reliability approach is selected in response to determining a size of the first data is larger than a large data size threshold level.

11. The method of claim 9, wherein the high retrieval reliability approach is selected in response to determining that a time frame since a last retrieval is greater than a retrieval time frame threshold level.

12. The method of claim 9, wherein the low retrieval reliability approach is selected in response to determining to maximize I/O operations per second.

13. A processing system of a dispersed storage processing unit comprises:
at least one processor;
a memory that stores operational instructions, that when executed by the at least one processor cause the processing system to:
receive first data for storage;
determine a first storage approach for the first data based on the first data, wherein determining the first storage approach includes determining a number of sets of storage units for storage of the first data;
facilitate storage of the first data in a plurality of sets of storage units in accordance with the first storage approach, the plurality of sets of storage units corresponding to the number of sets of storage units;
determine to recover the first data from storage based on at least one of: receiving an access request that includes a read data request or detecting loss of the first data from at least one set of storage units of the plurality of sets of storage units;
select a selected set of storage units from the plurality of sets of storage units for recovery of the first data in accordance with one of: a high retrieval reliability approach or a low retrieval reliability approach; and
facilitate recovery of the first data from the selected set of storage units.

14. The processing system of claim 13, wherein a number of the plurality of sets of storage units is in accordance with the determined number of sets.

15. The processing system of claim 14, wherein the operational instructions, when executed by the at least one processor, further cause the processing system to:
receive second data for storage;
determine a second storage approach for the second data based on the second data, wherein determining the second storage approach includes determining to store the second data in exactly one set of storage units, and wherein determining the second storage approach further includes selecting the one set of storage units; and
facilitate storage of the second data in the one set of storage units in accordance with the second storage approach.

16. The processing system of claim 15, wherein a first set of the plurality of sets of storage units is in accordance with a first information dispersal algorithm (IDA) configuration, wherein a second set of the plurality of sets of storage units is in accordance with a second IDA configuration, wherein the first IDA configuration is wider than the second IDA configuration, and wherein the second set is selected for storage of the second data.

17. The processing system of claim 13, wherein determining the first storage approach includes selecting a plurality of information dispersal algorithm (IDA) configurations, further comprising:
selecting the plurality of sets of storage units based on determining each of the plurality of sets of storage units are in accordance with a corresponding one of the plurality of IDA configurations.

18. The processing system of claim 17, wherein the plurality of IDA configurations includes a first IDA configuration and a second IDA configuration, wherein the first IDA configuration is wider than the second IDA configuration, wherein a first set of the plurality of sets of storage units is in accordance with the first IDA configuration, and wherein a second set of the plurality of sets of storage units is in accordance with the second IDA configuration.

19. The processing system of claim 18, further comprising:
selecting from one of: the high retrieval reliability approach and the low retrieval reliability approach in response to determining to recover the first data;
wherein the first set is selected for recovery of the first data when the high retrieval reliability approach is selected; and
wherein the second set is selected for recovery of the first data when the low retrieval reliability approach is selected.

20. A non-transitory computer readable storage medium comprises:
at least one memory section that stores operational instructions that, when executed by a processing system of a storage network that includes a processor and a memory, causes the processing system to:
receive first data for storage;
determine a first storage approach for the first data based on the first data, wherein determining the first storage approach includes determining a number of sets of storage units for storage of the first data;
facilitate storage of the first data in a plurality of sets of storage units in accordance with the first storage approach, the plurality of sets of storage units corresponding to the number of sets of storage units;
determine to recover the first data from storage based on at least one of: receiving an access request that includes a read data request or detecting loss of the first data from at least one set of storage units of the plurality of sets of storage units;
select a selected set of storage units from the plurality of sets of storage units for recovery of the first data in accordance with one of: a high retrieval reliability approach or a low retrieval reliability approach; and
facilitate recovery of the first data from the selected set of storage units.

* * * * *